United States Patent
Shibata et al.

(10) Patent No.: US 9,041,700 B2
(45) Date of Patent: May 26, 2015

(54) STEREOSCOPIC DISPLAY DEVICE

(75) Inventors: Takeshi Shibata, Mobara (JP); Yoshihiro Kotani, Chiba (JP); Shouji Nagao, Chiba (JP)

(73) Assignee: JAPAN DISPLAY INC., Tokyo (JP)

( * ) Notice: Subject to any disclaimer, the term of this patent is extended or adjusted under 35 U.S.C. 154(b) by 467 days.

(21) Appl. No.: 13/316,652

(22) Filed: Dec. 12, 2011

(65) Prior Publication Data

US 2012/0154359 A1    Jun. 21, 2012

(30) Foreign Application Priority Data

Dec. 17, 2010  (JP) ................................. 2010-281526

(51) Int. Cl.
  *G09G 3/36* (2006.01)
  *G09G 5/00* (2006.01)
  *G02B 27/22* (2006.01)
  *H04N 13/04* (2006.01)

(52) U.S. Cl.
  CPC .......... *G09G 3/3655* (2013.01); *G02B 27/2214* (2013.01); *G09G 2300/023* (2013.01); *G09G 2300/0426* (2013.01); *G09G 2320/0247* (2013.01); *G09G 2330/021* (2013.01); *G09G 2330/025* (2013.01); *H04N 13/0409* (2013.01); *H04N 13/0497* (2013.01)

(58) Field of Classification Search
  None
  See application file for complete search history.

(56) References Cited

U.S. PATENT DOCUMENTS

| | | | |
|---|---|---|---|
| 6,559,677 B2* | 5/2003 | Nitawaki | 326/83 |
| 6,677,925 B1* | 1/2004 | Kawaguchi et al. | 345/98 |
| 2004/0070425 A1* | 4/2004 | Horiguchi et al. | 326/121 |
| 2006/0214688 A1* | 9/2006 | Pan et al. | 326/83 |
| 2009/0103177 A1* | 4/2009 | Jang et al. | 359/462 |

FOREIGN PATENT DOCUMENTS

JP    2007-72269    3/2007

* cited by examiner

*Primary Examiner* — Jonathan Horner
*Assistant Examiner* — Douglas M Wilson
(74) *Attorney, Agent, or Firm* — Lowe Hauptman & Ham, LLP

(57) ABSTRACT

The stereoscopic display device has a display panel, a barrier liquid crystal panel disposed on the display panel, and a driving circuit for driving the display panel and the barrier liquid crystal panel, in which the frame frequency of the display panel and the alternating frequency of the barrier liquid crystal panel are different, the barrier liquid crystal panel is driven by a driving voltage input from the driving circuit, the driving circuit has an inverter circuit for outputting the driving voltage, independently controls a p-type transistor and an n-type transistor in the inverter circuit, and has time periods in which both the p-type transistor and the n-type transistor are turned off when the driving voltage is switched from a high level to a low level or a low level to a high level.

6 Claims, 9 Drawing Sheets

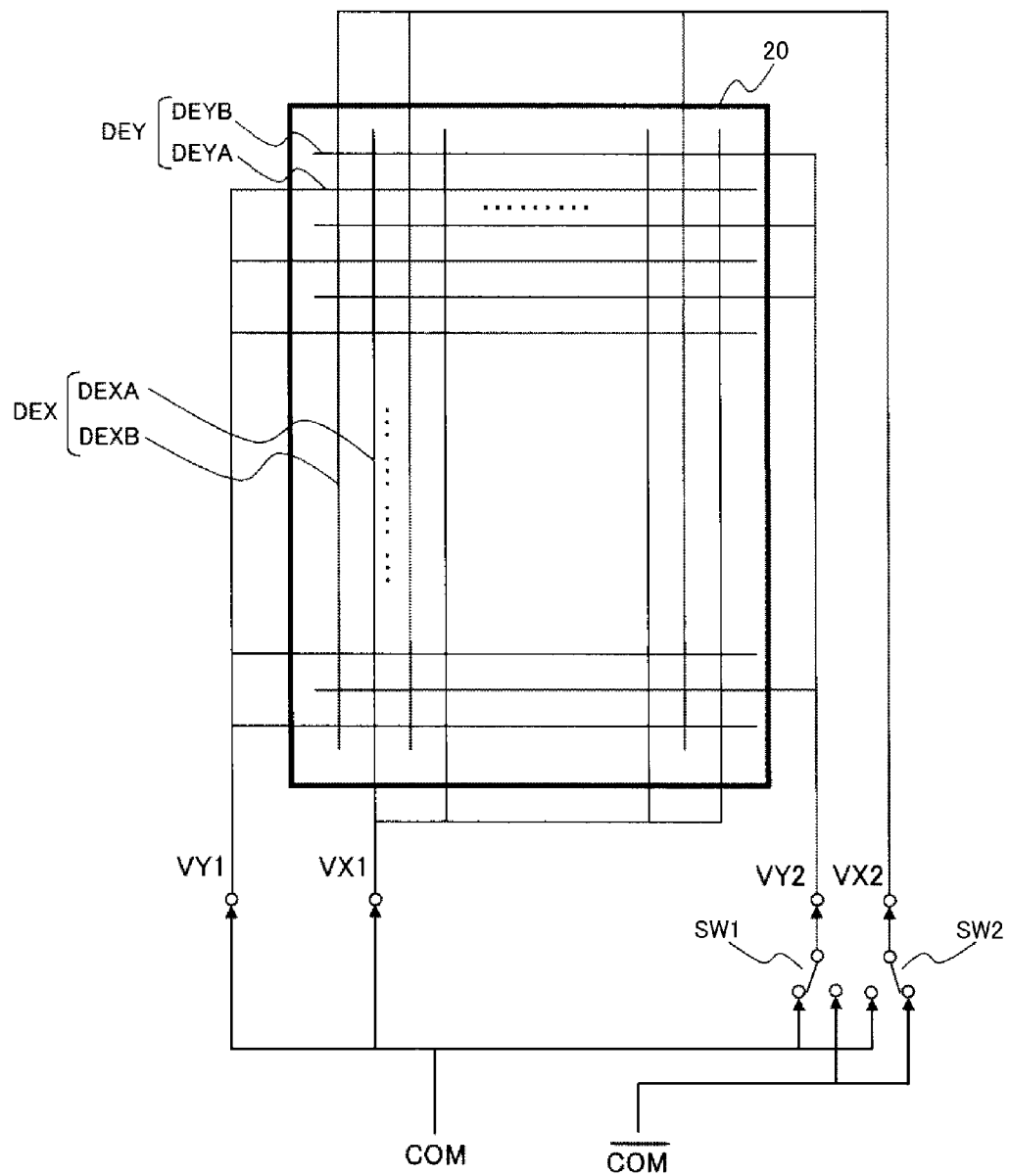

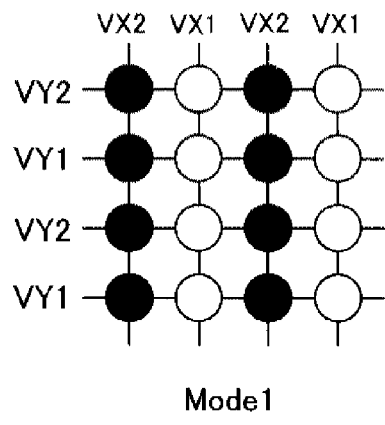
FIG.5A
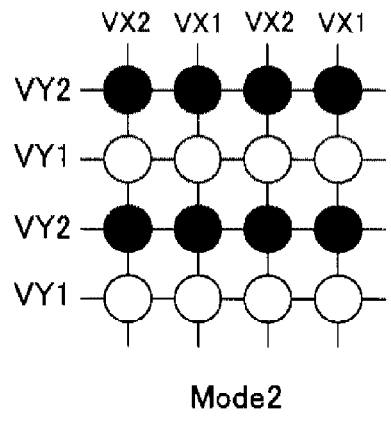
FIG.5B
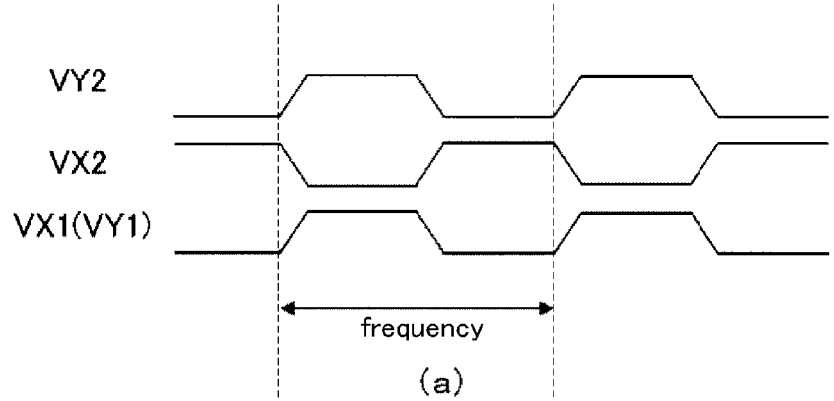
FIG.6
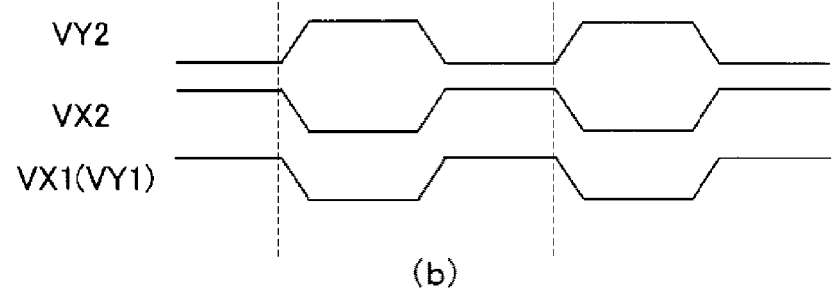

STEREOSCOPIC DISPLAY DEVICE

CROSS-REFERENCE TO RELATED APPLICATION

The present application claims priority from Japanese application JP2010-281526 filed on Dec. 17, 2010, the content of which is hereby incorporated by reference into this application.

BACKGROUND OF THE INVENTION

1. Field of the Invention

The present invention relates to a stereoscopic display device, and particularly to a parallax barrier stereoscopic display device.

2. Description of the Related Art

In the past, a variety of stereoscopic display devices that display 3-dimensional images have been suggested. Among them, a so-called "two-lens method" that uses binocular disparity is often used. The two-lens method produces left-eye images and right-eye images having binocular disparity, and a viewer sees the left-eye images with the left eye and the right-eye images with the right eye so that the viewer can observe 3-dimensional stereoscopic images of a subject. A typically known example of the stereoscopic display device with "two-lens method" is a parallax barrier stereoscopic display device (refer to JP2007-72269 A).

FIG. 12 is a schematic view for explaining a parallax barrier stereoscopic display device.

As shown in FIG. 12, the parallax barrier stereoscopic display device has a parallax barrier (hereinafter referred to simply as a barrier) 50 disposed in front of a display panel 60. The barrier 50 has light-shielding portions (black portions in FIG. 12) and light-passing portions (non-black portions in FIG. 12) formed alternately. In addition, the display panel 60 displays an image having left-eye images (L) and right-eye images (R) disposed alternately in the horizontal direction.

When an observer observes the display panel 60 through the barrier 50 at a site where stereoscopic images are visible, the barrier 50 separates the left-eye images (L) and the right-eye images (R) on the display panel 60, and the left-eye images (L) are visible only to the left eye 30, and the right-eye images (R) are visible only to the right eye 40, and therefore the observer can observe 3-dimensional stereoscopic images of a subject.

SUMMARY OF THE INVENTION

The parallax barrier stereoscopic display device as shown in FIG. 12 (hereinafter referred to simply as the 3D liquid crystal display) can be realized by using, for example, an active-matrix liquid crystal display device (hereinafter referred to as the main liquid crystal panel) as the display panel 60 and a simple-matrix liquid crystal display device (hereinafter referred to as the barrier liquid crystal panel) as the barrier 50.

In such a 3D liquid crystal display, it is effective to provide a driver for driving the barrier liquid crystal panel and a driver for driving the main liquid crystal panel on one chip in realizing the cost reduction.

However, when the driver for driving the barrier liquid crystal panel and the driver for driving the main liquid crystal panel are provided on one chip, an inrush current flows and power supply noise is caused in switching signals for driving the barrier liquid crystal panel, creating a problem in that abnormal display, such as flickering, occurs on the display screen of the main liquid crystal panel.

The invention has been made to solve the problem of the related art, and the object of the invention is to provide a technique that can suppress an inrush current in switching signals for driving the barrier liquid crystal panel and improve the display quality of images displayed on the display panel in a stereoscopic display device having the driver for driving the barrier liquid crystal panel and the driver for driving the display panel provided on one chip.

The above and other objects and novel features of the invention will be clarified by the description and accompanying drawing of the present specification.

The following is the simple description of the typical outline of the invention as disclosed in the present application.

(1) A stereoscopic display device has a display panel, a barrier liquid crystal panel disposed on the display panel, and a driving circuit for driving the display panel and the barrier liquid crystal panel, in which the frame frequency of the display panel and the alternating frequency of the barrier liquid crystal panel are different, the barrier liquid crystal panel is driven by a driving voltage input from the driving circuit, the driving circuit has an inverter circuit for outputting the driving voltage, independently controls a p-type transistor and an n-type transistor in the inverter circuit, and has time periods in which both the p-type transistor and the n-type transistor are turned off when the driving voltage is switched from a high level to a low level or a low level to a high level.

(2) In the above (1), the p-type transistor is turned off before the n-type transistor is turned on when the driving voltage is switched from a high level to a low level, and the n-type transistor is turned off before the p-type transistor is turned on when the driving voltage is switched from a low level to a high level.

(3) In the above (1), the p-type transistor and the n-type transistor in the inverter circuit remain in the on state for a shorter period than when in the off state.

(4) In the above (1), the barrier liquid crystal panel is a simple-matrix liquid crystal display panel, the barrier liquid crystal panel has plural X electrodes and plural Y electrodes that intersects the plural X electrodes respectively, the plural X electrodes is composed of plural first X electrodes and plural second X electrodes which are disposed alternately, the plural Y electrodes is composed of plural first Y electrodes and plural second Y electrodes which are disposed alternately, the driving voltage is input to the plural first X electrodes, the plural first Y electrodes, and the plural second Y electrodes, and a reverse driving voltage which has a reverse phase with respect to the driving voltage is input to the plural second X electrodes.

(5) In the above (4), the plural second X electrodes and the plural Y electrodes are short-circuited while both the p-type transistor and the n-type transistor are turned off.

(6) In the above (1), the barrier liquid crystal panel is a simple-matrix liquid crystal display panel, the barrier liquid crystal panel has plural X electrodes and plural Y electrodes that intersects the plural X electrodes respectively, the plural X electrodes is composed of plural first X electrodes and plural second X electrodes which are disposed alternately, the plural Y electrodes is composed of plural first Y electrodes and plural second Y electrodes which are disposed alternately, the driving voltage is input to the plural first X electrodes, the plural second X electrodes, and the plural first Y electrodes, and a reverse driving voltage which has a reverse phase with respect to the driving voltage is input to the plural second Y electrodes.

(7) In the above (6), the plural X electrodes and the plural second Y electrodes are short-circuited while both the p-type transistor and the n-type transistor are turned off.

(8) In the above (4) or (6), the plural X electrodes and the plural Y electrodes are short-circuited while both the p-type transistor and the n-type transistor are turned off.

(9) In the above (1), the inverter circuit has a first resistance element connected to a first electrode in the p-type transistor and a second resistance element connected to a first electrode in the n-type transistor.

(10) In the above (1), the alternating frequency of the barrier liquid crystal panel is lower than the frame frequency of the display panel.

The following is a simple description of the effects obtained by the typical aspects of the invention as disclosed in the present application.

According to the invention, it is possible to suppress an inrush current in switching signals for driving the barrier liquid crystal panel and improve the display quality of images displayed on the display panel in a stereoscopic display device having the driver for driving the barrier liquid crystal panel and the driver for driving the display panel provided on one chip.

BRIEF DESCRIPTION OF THE DRAWINGS

FIG. 4 is a view for explaining the X electrodes and the Y electrodes of the simple-matrix barrier liquid crystal display panel as shown in FIG. 1.

FIG. 5 is a view showing barrier patterns displayed on the simple-matrix barrier liquid crystal display panel.

FIGS. 6A and 6B are views showing the voltage waveforms of VX1, VX2, VY1, and VY2 as shown in FIG. 5.

DETAILED DESCRIPTION OF THE INVENTION

Figure 1:
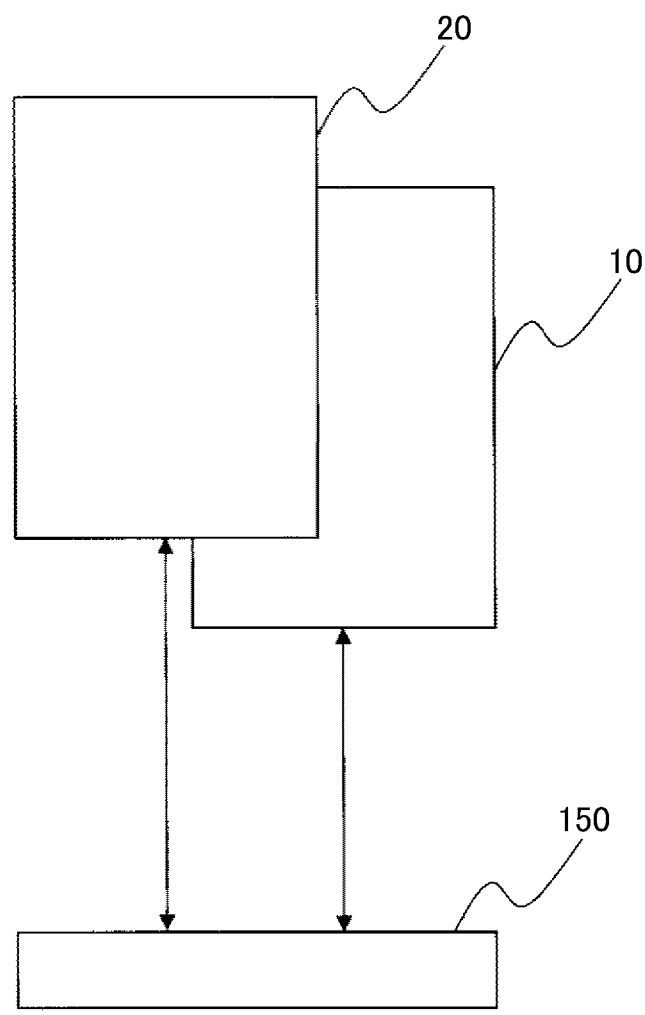
FIG. 1 is a schematic view for explaining the parallax barrier stereoscopic display device of the first embodiment of the invention.

Hereinafter, the embodiments of the invention will be described in detail with reference to the accompanying drawings.

Meanwhile, in all the drawings for explaining the embodiments, elements having the same function will be given the same reference numeral, and not be described again. In addition, the following embodiments do not limit the interpretation of the claims of the invention.

First Embodiment

FIG. 1 is a schematic view for explaining the parallax barrier stereoscopic display device of the first embodiment of the invention.

The parallax barrier stereoscopic display device of the present embodiment has an active-matrix liquid crystal display device 10, a simple-matrix barrier liquid crystal display panel 20 disposed in front of the liquid crystal display device 10, and a liquid crystal driving circuit (driver) 150 for driving the liquid crystal display device 10 and the barrier liquid crystal display panel 20.

Figure 2:
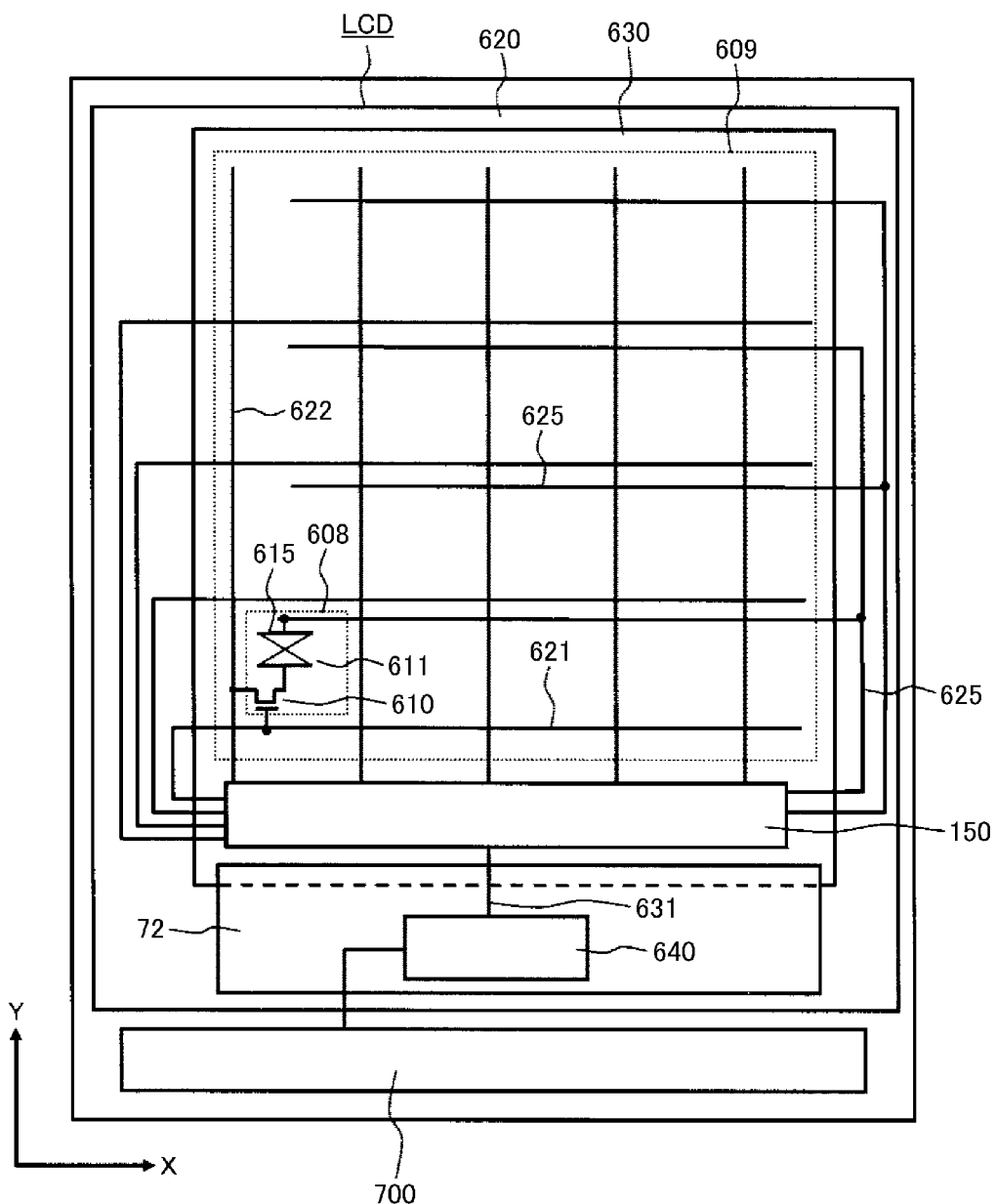
FIG. 2 is a block diagram showing the schematic configuration of the active-matrix liquid crystal display device as shown in FIG. 1.

FIG. 2 is a block diagram showing the schematic configuration of the active-matrix liquid crystal display device 10 as shown in FIG. 1.

The active-matrix liquid crystal display device 10 as shown in FIG. 2 is composed of an active-matrix liquid crystal display panel (LCD), a liquid crystal driving circuit 150, a flexible printing substrate 72, and a backlight 700.

The liquid crystal driving circuit 150 is provided at one side of the liquid crystal display panel (LCD), and supplies a variety of signals to the liquid crystal display panel (LCD) and the barrier liquid crystal display panel 20. The flexible printing substrate 72 is electrically connected to the liquid crystal driving circuit 150 for supplying signals from the outside.

The liquid crystal display panel (LCD) is configured as follows: a substrate 620 (hereinafter referred to also as the TFT substrate) and a substrate 630 having color filters and the like formed thereon (hereinafter referred to also as the filter substrate) are overlapped with a predetermined gap, both substrates are adhered by a sealing material (not shown) provided in a frame shape near the circumferential portion of both substrates, a liquid crystal composition is fed and sealed in the sealing material, furthermore, polarizing plates are adhered to the outsides of both substrates, and the flexible printing substrate 72 is connected to the TFT substrate 620. The substrate 620 has a thin film transistor 610, a pixel electrode 611, an opposite electrode (common electrode) 615, and the like formed thereon.

Meanwhile, the present embodiment is also similarly applied to a so-called horizontal electric field liquid crystal display panel having the opposite electrode 615 provided at the TFT substrate 620 and a so-called vertical electric field liquid crystal display panel having the opposite electrode 615 provided at the filter substrate 630.

In FIG. 2, scanning lines 621 that extend along the x direction in the drawing in parallel at intervals along the y direction (referred to also as gate lines) and imaging lines 622 that extend along the y direction in the drawing in parallel at intervals along the x direction (referred to also as drain lines) are provided, and pixel portions 608 are formed at areas surrounded by the scanning lines 621 and the imaging lines 622. In addition, in FIG. 2, opposite electrode lines 625 that extend along the x direction in the drawing in parallel at intervals along the y direction are also provided.

Meanwhile, the liquid crystal display panel (LCD) has a number of pixel portions 608 in a matrix shape, but FIG. 2 shows only one pixel portion 608 for easy understanding of the drawing. The pixel portions 608 disposed in a matrix shape form a display area 609, and each of the pixel portions 608 plays the role of a pixel for a displayed image and displays an image on the display area 609.

The thin film transistor 610 in each of the pixel portions 608 has a source connected to the pixel electrode 611, a drain connected to the imaging line 622, and a gate connected to the scanning line 621. The thin film transistor 610 functions as a switch for supplying a display voltage (gradation voltage) to the pixel electrode 611.

Meanwhile, the source and the drain may be switched due to the bias relationship; however, here, the element connected to the imaging line 622 is called the drain. In addition, the pixel electrode 611 and the opposite electrode 615 form a capacity (liquid crystal capacity).

The liquid crystal driving circuit 150 is disposed on a transparent insulating substrate that composes the TFT substrate 620 (glass substrate, resin substrate, or the like), and is connected to the scanning line 621, the imaging line 622, and the opposite electrode line 625.

The flexible printing substrate 72 is connected to the TFT substrate 620. In addition, the flexible printing substrate 72 is provided with a connector 640. The connector 640 is connected with an external signal line, and external signals are input to the connector 640. A wire 631 is provided between the connector 640 and the liquid crystal driving circuit 150, and external signals are input to the liquid crystal driving circuit 150.

In addition, the flexible printing substrate 72 supplies constant voltages to the backlight 700. The backlight 700 is used as a light source for the liquid crystal display panel (LCD). Meanwhile, the backlight 700 is provided at either the rear surface or the front surface of the liquid crystal display panel (LCD), but FIG. 1 displays the backlight in parallel with the liquid crystal display panel (LCD) for simplifying the drawing.

In addition, the liquid crystal driving circuit 150 outputs gradation voltages that correspond to the gradation at which pixels are displayed to the imaging lines 622. When the thin film transistor 610 is turned on (conduction), a gradation voltage (image signal) is supplied to the pixel electrode 611 from the imaging line 622. After that, the thin film transistor 610 is turned off, and therefore the gradation voltage is maintained in the pixel electrode 611 based on an image that the pixels are supposed to display.

A constant opposite electrode voltage is applied to the opposite electrode 615 through the opposite electrode line 625, the liquid crystal display panel (LCD) alters the orientation direction of liquid crystal molecules interposed between the pixel electrode 611 and the opposite electrode 615 using the potential difference between the pixel electrode 611 and the opposite electrode 615, and alters the transmittance or reflectivity of light, thereby displaying an image.

Figure 3:
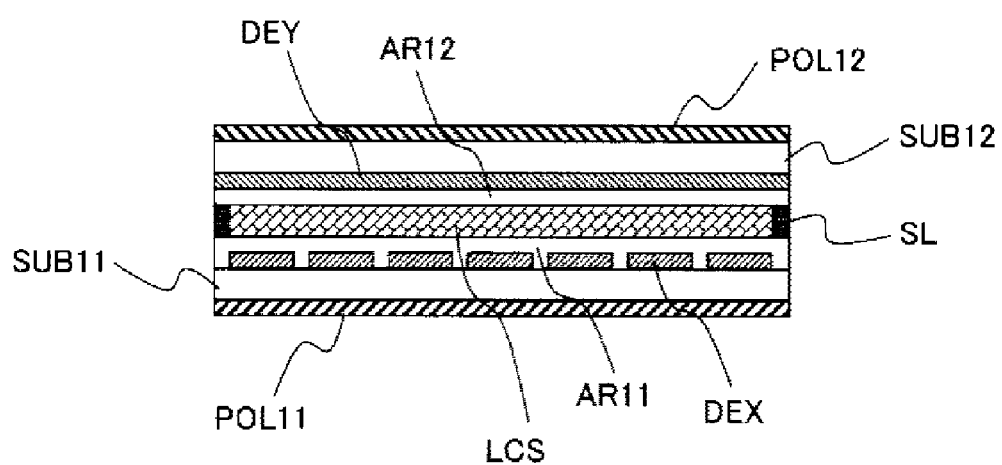
FIG. 3 is a cross-sectional view showing the schematic cross-sectional structure of the simple-matrix barrier liquid crystal display panel as shown in FIG. 1.

FIG. 3 is a cross-sectional view showing the schematic cross-sectional structure of the simple-matrix barrier liquid crystal display panel 20 as shown in FIG. 1.

As shown in FIG. 3, the simple-matrix barrier liquid crystal display panel 20 is configured as follows: plural X electrodes (DEX), a substrate (SUB11) having an orientation film (AR11) formed thereon, plural Y electrodes (DEY), and a substrate (SUB12) having an orientation film (AR12) formed thereon are overlapped with a predetermined gap, both substrates are adhered by a sealing material (SL) provided in a frame shape near the circumferential portion of both substrates, a liquid crystal (LCS) is fed and sealed in the sealing material, and, furthermore, polarizing plates (POL11 and POL12) are adhered to the outsides of both substrates.

The plural X electrodes (DEX) and the plural Y electrodes (DEY) are formed of band-shaped electrodes respectively, and disposed so as to intersect each other.

FIG. 4 is a view for explaining the X electrodes and the Y electrodes of the simple-matrix barrier liquid crystal display panel 20 as shown in FIG. 1.

As shown in FIG. 4, the plural X electrodes (DEX) is composed of plural first X electrodes (DEXA) and plural second X electrodes (DEXB), which are alternately disposed in a reed shape respectively, and the plural Y electrodes (DEY) is composed of plural first Y electrodes (DEYA) and plural second Y electrodes (DEYB), which are alternately disposed in a reed shape respectively.

The plural first X electrodes (DEXA) is commonly connected at, for example, one short side of the barrier liquid crystal display panel 20, and the driving voltage of VX1 is input to each of the first X electrodes (DEXA). In addition, the plural second X electrodes (DEXB) is commonly connected at, for example, the other short side of the barrier liquid crystal display panel 20, and the driving voltage of VX2 is input to each of the second X electrodes (DEXB).

Similarly, the plural first Y electrodes (DEYA) is commonly connected at, for example, one long side of the barrier liquid crystal display panel 20, and the driving voltage of VY1 is input to each of the first Y electrodes (DEYA). In addition, the plural second Y electrodes (DEYB) is commonly connected at, for example, the other long side of the barrier liquid crystal display panel 20, and the driving voltage of VY2 is input to each of the second Y electrodes (DEYB).

As shown in FIG. 4, the voltage of COM is input to the plural first X electrodes (DEXA) as the driving voltage of VX1, and, similarly, the voltage of COM is also input to the plural first Y electrodes (DEYA) as the driving voltage of VY1.

Furthermore, either the voltage of COM or the voltage of bar COM which has a reverse phase with respect to the voltage of COM is input to the plural second X electrodes (DEXB) as the voltage of VX2 using a switch circuit (SW1), and either the voltage of COM or the voltage of bar COM which has a reverse phase with respect to the voltage of COM is input to the plural second Y electrodes (DEYB) as the voltage of VY2 using a switch circuit (SW2).

FIG. 5 shows barrier patterns displayed on the simple-matrix barrier liquid crystal display panel 20. Meanwhile, FIG. 5 shows a case in which a normally white liquid crystal display panel, such as TN, is used as the barrier liquid crystal display panel 20.

In addition, FIGS. 6A and 6B are views showing the voltage waveforms of VX1, VX2, VY1, and VY2 as shown in FIG. 5.

Mode 1 in FIG. 5 is a barrier pattern display when the barrier liquid crystal display panel 20 is used in the vertical direction. As shown in FIG. 6A, in Mode 1 of FIG. 5, the voltage of VY2 is in the same phase as the voltage of VX1 (or VY1), and the voltage of VX2 is in the reverse phase of the voltage of VX1 (or VY1).

Therefore, in the case of Mode 1 of FIG. 5, sites between the first Y electrodes (DEYA) to which the voltage of VY1 is input and the first X electrodes (DEXA) to which the voltage of VX1 is input and between the second Y electrodes (DEYB) to which the voltage of VY2 is input and the first X electrodes (DEXA) to which the voltage of VX1 is input display white (that is, a state in which light is passed), and sites between the first Y electrodes (DEYA) to which the voltage of VY1 is input and the second X electrodes (DEXB) to which the voltage of VX2 is input and between the second Y electrodes (DEYB) to which the voltage of VY2 is input and the second X electrodes (DEXB) to which the voltage of VX2 is input display black (that is, a state in which light is shielded).

Mode 2 in FIG. 5 is a barrier pattern display when the barrier liquid crystal display panel 20 is used in the horizontal direction. As shown in FIG. 6B, in Mode 2 of FIG. 5, the voltage of VY2 is in the reverse phase of the voltage of VX1 (or VY1), and the voltage of VX2 is in the same phase as the voltage of VX1 (or VY1).

Therefore, in the case of Mode 2 of FIG. 5, sites between the first Y electrodes (DEYA) to which the voltage of VY1 is input and the first X electrodes (DEXA) to which the voltage of VX1 is input and between the first Y electrodes (DEYA) to which the voltage of VY1 is input and the second X electrodes (DEXB) to which the voltage of VX2 is input display white, and sites between the second Y electrodes (DEYB) to which the voltage of VY2 is input and the first X electrodes (DEXA) to which the voltage of VX1 is input and between the second Y electrodes (DEYB) to which the voltage of VY2 is input and the second X electrodes (DEXB) to which the voltage of VX2 is input display black.

Since the service life of the liquid crystals is shortened when a direct current is applied to the liquid crystals for a long time, the voltages of VX1, VX2, COM, VY1, and VY2 are alternated even in the barrier liquid crystal display panel 20 as shown in FIGS. 6A and 6B.

Here, it is not necessary to synchronize the alternating frequency (frequency in FIGS. 6A and 6B) of the barrier liquid crystal display panel 20 with the frame frequency of the liquid crystal display device 10. For example, when the frame frequency of the active-matrix liquid crystal display device 10 is 60 Hz, the alternating frequency of the barrier liquid crystal display panel 20 may be, for example, 40 Hz or 80 Hz. Meanwhile, power consumption can be reduced by slowing the alternating frequency.

Problems of the Related Art

Figure 11A:
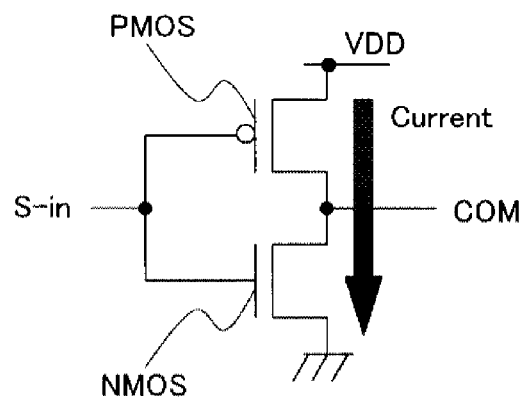
FIG. 11A is a view showing the circuit configuration of the inverter for outputting driving voltages in a parallax barrier stereoscopic display device of the related art.
Figure 11B:
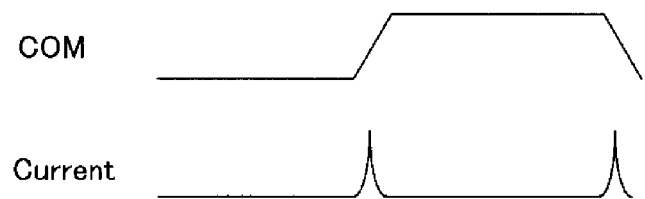
FIG. 11B is a view showing the voltage waveform of the output voltage of the inverter for outputting driving voltages and the current waveform of an inrush current in a parallax barrier stereoscopic display device of the related art.
Figure 12:
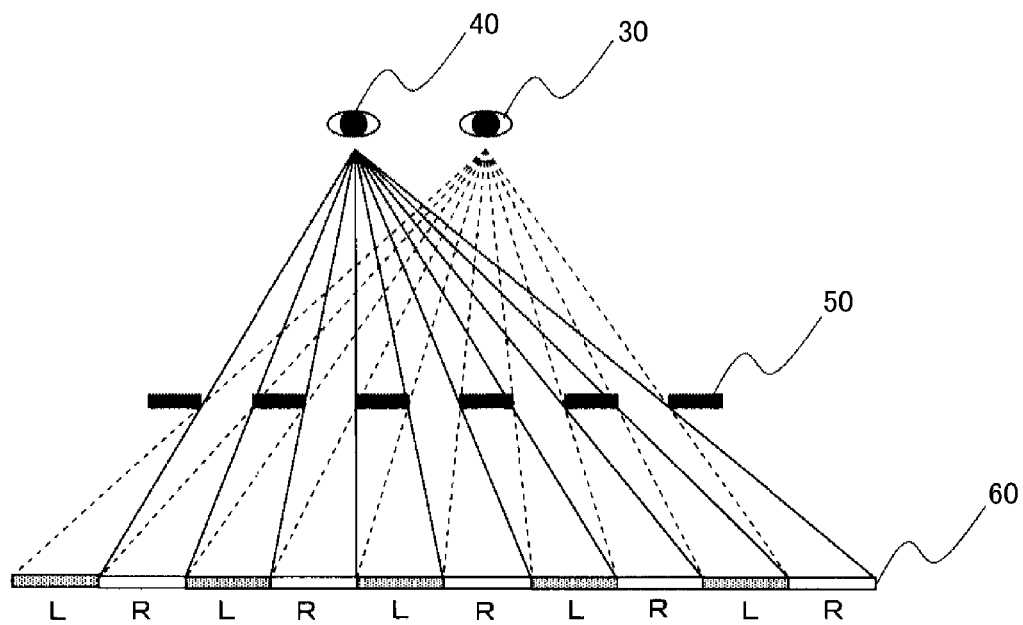
FIG. 12 is a schematic view for explaining the parallax barrier stereoscopic display device.

FIG. 11A is a view showing the circuit configuration of the inverter for outputting driving voltages in a parallax barrier stereoscopic display device of the related art, and FIG. 11B is a view showing the voltage waveform of the output voltage of the inverter and the current waveform of an inrush current.

Hereinafter, the problems of a parallax barrier stereoscopic display device of the related art will be described with reference to FIGS. 11A and 11B before describing the features of the invention.

When the active-matrix liquid crystal display device 10 and the simple-matrix barrier liquid crystal display panel 20 are driven using one liquid crystal driving circuit 150, abnormal display, such as flickering, is shown on the display screen of the liquid crystal display device 10 at points of time when the driving voltage of the barrier liquid crystal display panel 20 is switched from a high level (hereinafter H level) to a low level (hereinafter L level) and switched from the L level to the H level in alternating the driving voltage of the barrier liquid crystal display panel 20.

The phenomenon can be described as follows. Generally, the driving voltage of the barrier liquid crystal display panel 20 is output from the inverter.

As shown in FIG. 11B, there are time periods in which a p-type MOS transistor (PMOS) and an n-type MOS transistor (NMOS) are turned on at the same time when the voltage of COM output from the inverter is switched from the H level to the L level and switched from the L level to the H level, and an inrush current flows toward a power supply line through which the voltage of GND is supplied from a power supply line through which the voltage of VDD is supplied through the inverter.

Here, in a case in which the driving generation capacity of a power supply circuit is low, for example, a charge pump-generating power supply circuit, voltage drop occurs in the power supply line. In addition, when the alternating frequency of the barrier liquid crystal display panel 20 and the frame frequency of the liquid crystal display device 10 are different, the voltage drop occurs in the power supply line while the liquid crystal display device 10 displays an image, which causes noise and degradation of the quality of displayed images.

Features of the First Embodiment

Figure 7A:
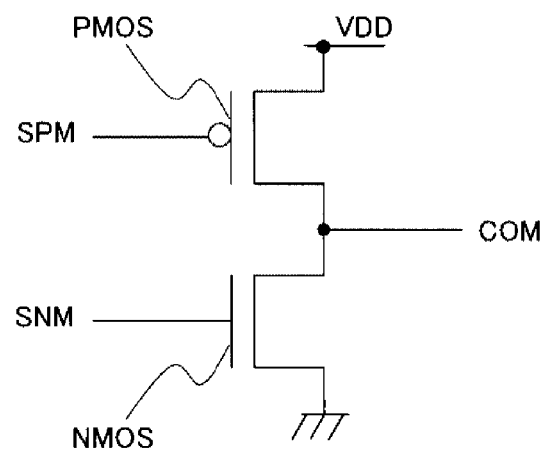
FIG. 7A is a view showing the circuit configuration of the inverter for outputting a driving voltage in the parallax barrier stereoscopic display device of the first embodiment of the invention.
Figure 7B:
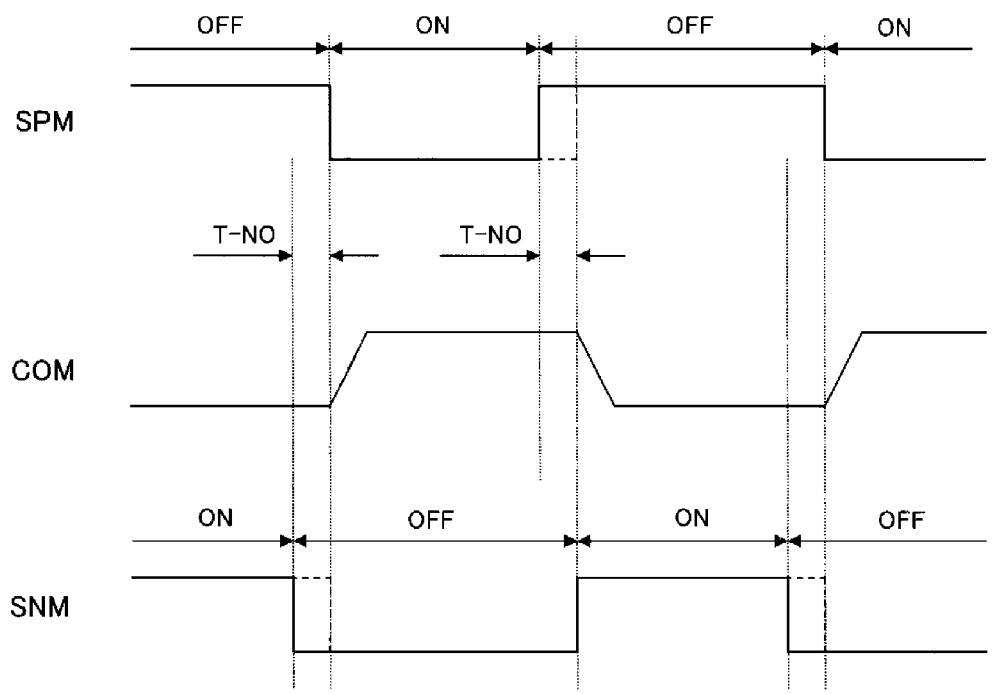
FIG. 7B is a view showing the voltage waveforms of control signals input to the inverter of FIG. 7A and the voltage waveform of a driving voltage output from the inverter of FIG. 7A.
Figure 7C:
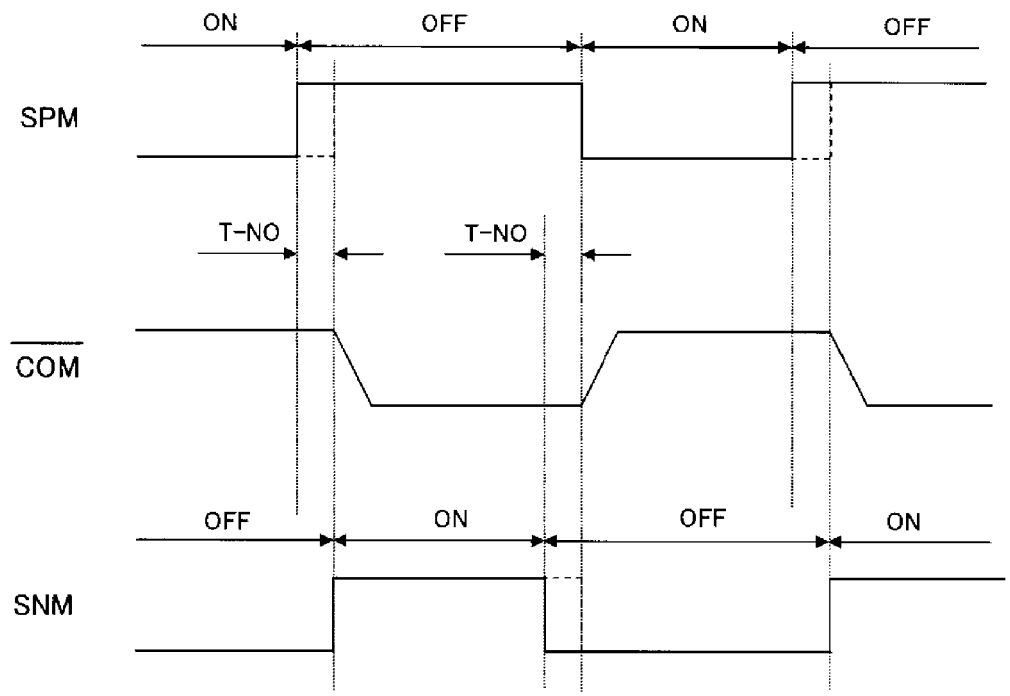
FIG. 7C is a view showing the voltage waveforms of control signals input to the inverter of FIG. 7A and the voltage waveform of a reverse driving voltage output from the inverter of FIG. 7A.

FIG. 7A is a view showing the circuit configuration of the inverter for outputting a driving voltage in the parallax barrier stereoscopic display device of the embodiment of the invention. FIG. 7B is a view showing the voltage waveforms of control signals input to the inverter of FIG. 7A and the voltage waveform of a driving voltage output from the inverter of FIG. 7A. FIG. 7C is a view showing the voltage waveforms of control signals input to the inverter of FIG. 7A and the voltage waveform of a reverse driving voltage output from the inverter of FIG. 7A.

As shown in FIG. 7A, in the present embodiment, the control signal of SPM is input to the gate of the p-type MOS transistor (PMOS) that composes the inverter for outputting the driving voltage, and the control signal of SNM is input to the gate of the n-type MOS transistor (NMOS).

As such, in the embodiment, different control signals are input to the gate of the p-type MOS transistor (PMOS) and the gate of the n-type MOS transistor (NMOS), and the p-type MOS transistor (PMOS) and the n-type MOS transistor (NMOS) are independently controlled.

The control signal of SPM is turned into the H level from the L level before the control signal of SNM is turned into the H level from the L level, and the control signal of SNM is turned into the L level from the H level before the control signal of SPM is turned into the L level from the H level.

Therefore, as shown in FIG. 7B, the p-type MOS transistor (PMOS) and the n-type MOS transistor (NMOS) are turned off at the same time immediately before the voltage level of the voltage of COM output from the inverter is switched (within the flyback period of the barrier liquid crystal display panel 20). After that, one MOS transistor is turned on according to the voltage level of COM.

As such, in the inverter of the embodiment, since there are time periods in which both the p-type MOS transistor (PMOS) and the n-type MOS transistor (NMOS) are turned off (non-overlap periods; T-NO), and the p-type MOS transistor (PMOS) and the n-type MOS transistor (NMOS) are not turned on at the same time, it is possible to suppress the inrush current that flows toward the power supply line through which the voltage of GND is supplied from the power supply line through which the voltage of VDD is supplied through the inverter.

As a result, in the embodiment, it is possible to reduce the flickering that occurs on the display screen of the liquid crystal display device 10 at points of time when the driving voltage of the barrier liquid crystal display panel 20 is switched from the H level to the L level and switched from the L level to the H level in alternating the driving voltage of the barrier liquid crystal display panel 20.

In the parallax barrier stereoscopic display device, there is a demand for reducing the burden on the eyes of observers. In the embodiment, since it is possible to reduce the flickering that occurs on the display screen of the liquid crystal display device 10 at points of time when the driving voltage of the barrier liquid crystal display panel 20 is switched from the H level to the L level and switched from the L level to the H level in alternating the driving voltage of the barrier liquid crystal display panel 20 and obtain a favorable image quality, eye fatigue can be alleviated. Meanwhile, the voltage waveforms indicated by dotted lines in FIGS. 7B and 7C are the voltage waveforms of the control voltages input to the inverter in the parallax barrier stereoscopic display device of the related art.

In addition, FIG. 7C is a view showing the voltage waveforms of the control signals of SPM and the control signals of SNM for generating the voltage of bar COM which has a reverse phase with respect to the voltage of COM (the reverse driving voltage of the invention) in the inverter of FIG. 7A, but the phases of the control signal of SPM and the control signal of SNM are simply 180 degrees different, and therefore the detailed description will not be made.

Modified Embodiment

In the present embodiment, electric current consumed can be suppressed by short-circuiting the electrodes that display black of the plural X electrodes (DEX) and the plural Y electrodes (DEY) during the non-overlap periods (T-NO) as shown in FIGS. 7B and 7C.

Figure 8:
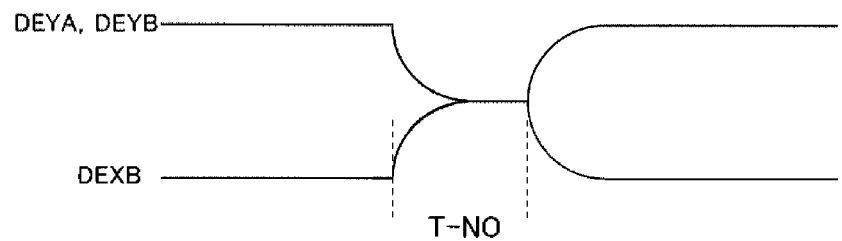
FIG. 8 is a view for explaining the effect of short-circuiting the electrodes that display black of the plural X electrodes and the plural Y electrodes during the non-overlap periods as shown in FIGS. 7B and 7C.

For example, in the case of Mode 1, when the second X electrodes (DEXB) and the first Y electrodes (DEYA), and the second X electrodes (DEXB) and the second Y electrodes (DEYB) are short-circuited during the non-overlap periods (T-NO) as shown in FIGS. 7B and 7C, the potentials of the second X electrodes (DEXB), the first Y electrodes (DEYA), and the second Y electrodes (DEYB) become an intermediate potential between the voltage of COM and the voltage of bar COM as shown in FIG. 8, and therefore the voltage change becomes approximately half at the subsequent voltage insertion, and power consumption can be suppressed.

Figure 9:
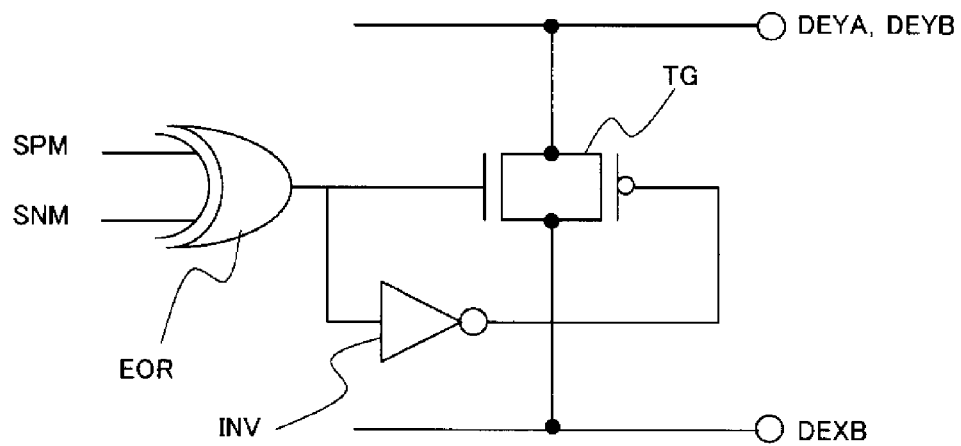
FIG. 9 is a circuit diagram showing a circuit configuration for short-circuiting the electrodes that display black of the plural X electrodes and the plural Y electrodes during the non-overlap periods as shown in FIGS. 7B and 7C.

In order to short-circuit the electrodes that display black of the plural X electrodes (DEX) and the plural Y electrodes (DEY) during the non-overlap periods (T-NO) as shown in FIGS. 7B and 7C, it is necessary to provide a transfer gate circuit (TG) between the wire connected to the first Y electrodes (DEYA) and the second Y electrodes (DEYB) and the wire connected to the second X electrodes (DEXB) in the liquid crystal driving circuit 150 as shown in FIG. 9 so that the transfer gate circuit (TG) is controlled using an exclusive OR circuit (EOR) to which the control signals of SPM and the control signals of SNM are input. Meanwhile, in FIG. 9, INV indicates the inverter.

The exclusive OR circuit (EOR) to which the control signals of SPM and the control signals of SNM are input turns into the H level when the control signal of SPM and the control signal of SNM do not match. Thereby, the transfer gate circuit (TG) is turned on during the non-overlap periods (T-NO) as shown in FIGS. 7B and 7C, and the electrodes that display black of the plural X electrodes (DEX) and the plural Y electrodes (DEY) can be short-circuited. Meanwhile, the circuit as shown in FIG. 9 is provided in the liquid crystal driving circuit 150.

In addition, in the case of Mode 2, electric current consumed can be suppressed by short-circuiting the second Y electrodes (DEYB) and the first X electrodes (DEXA) and the second Y electrodes (DEYB) and the second X electrodes (DEXB) during the non-overlap periods (T-NO) as shown in FIGS. 7B and 7C.

Furthermore, the entire X electrodes (DEX) and the entire Y electrodes (DEY) may be short-circuited.

Second Embodiment

Figure 10A:
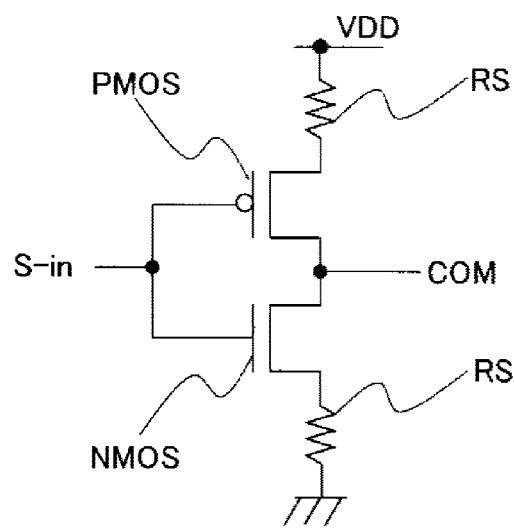
FIG. 10A is a view showing the circuit configuration of the inverter for outputting driving voltages in the parallax barrier stereoscopic display device of the second embodiment of the invention.
Figure 10B:
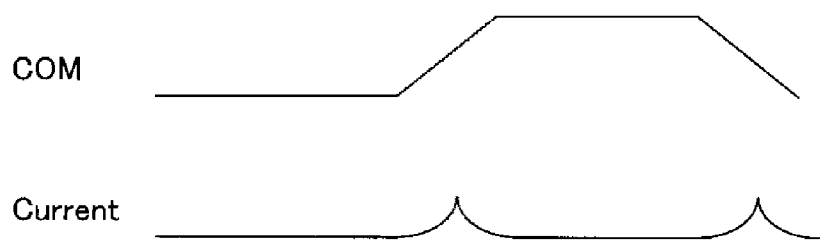
FIG. 10B is a view showing the voltage waveform of the output voltage of the inverter for outputting driving voltages and the current waveform of an inrush current in the parallax barrier stereoscopic display device of the second embodiment of the invention.

FIG. 10A is a view showing the circuit configuration of the inverter for outputting driving voltages in the stereoscopic display device of the second embodiment of the invention, and FIG. 10B is a view showing the voltage waveform of the output voltage of the inverter and the current waveform of an inrush current.

The present embodiment is different from the first embodiment in that resistance elements of RS are provided between the p-type MOS transistor (PMOS) and the power supply line through which the voltage of VDD is supplied and between the n-type MOS transistor (NMOS) and the power supply line through which the voltage of GND is supplied in the inverter for outputting the driving voltage.

In the embodiment, the peak current value of the inrush current can be suppressed using the resistance elements of RS even when there are time periods in which both the p-type MOS transistor (PMOS) and the n-type MOS transistor (NMOS) are turned on at the same time when the voltage of COM output from the inverter is switched from the H level to the L level and switched from the L level to the H level, and an inrush current flows toward the power supply line through which the voltage of GND is supplied from the power supply line through which the voltage of VDD is supplied through the inverter.

Meanwhile, the above description describes a case in which the simple-matrix barrier liquid crystal display panel 20 is disposed in front of the active-matrix liquid crystal display device 10, but an inorganic EL display device or an organic EL display device may be used instead of the liquid crystal display device 10.

In the above, though the invention made by the present inventors has been described in detail based on the embodiments, the invention is not limited to the embodiments, and naturally can be modified variously within the scope not departing from the gist of the invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A stereoscopic display device comprising:
a display panel,
a barrier liquid crystal panel disposed on the display panel, and
a driving circuit for driving the display panel and the barrier liquid crystal panel,
wherein the frame frequency of the display panel and the alternating frequency of the barrier liquid crystal panel are different,
wherein the barrier liquid crystal panel is driven by a driving voltage input from the driving circuit,
wherein the driving circuit has an inverter circuit for outputting the driving voltage,
wherein the driving circuit independently controls a p-type transistor and an n-type transistor in the inverter circuit, and has time periods in which both the p-type transistor and the n-type transistor are turned off when the driving voltage is switched from a high level to a low level or a low level to a high level,
wherein the barrier liquid crystal panel is a simple-matrix liquid crystal display panel,
wherein the barrier liquid crystal panel has a plurality of X electrodes and a plurality of Y electrodes that intersects the plurality of X electrodes respectively,
wherein the plurality of X electrodes is composed of a plurality of first X electrodes and a plurality of second X electrodes which are disposed alternately,
wherein the plurality of Y electrodes is composed of a plurality of first Y electrodes and a plurality of second Y electrodes which are disposed alternately,
wherein the driving voltage is input to the plurality of first X electrodes, the plurality of first Y electrodes, and the plurality of second Y electrodes, and
wherein a reverse driving voltage which has a reverse phase with respect to the driving voltage is input to the plurality of second X electrodes.

2. The stereoscopic display device according to claim 1, wherein the plurality of second X electrodes and the plurality of Y electrodes are short-circuited while both the p-type transistor and the n-type transistor are turned off.

3. A stereoscopic display device comprising:
a display panel,
a barrier liquid crystal panel disposed on the display panel, and
a driving circuit for driving the display panel and the barrier liquid crystal panel,
wherein the frame frequency of the display panel and the alternating frequency of the barrier liquid crystal panel are different,
wherein the barrier liquid crystal panel is driven by a driving voltage input from the driving circuit,
wherein the driving circuit has an inverter circuit for outputting the driving voltage,
wherein the driving circuit independently controls a p-type transistor and an n-type transistor in the inverter circuit, and has time periods in which both the p-type transistor and the n-type transistor are turned off when the driving voltage is switched from a high level to a low level or a low level to a high level,
wherein the barrier liquid crystal panel is a simple-matrix liquid crystal display panel,
wherein the barrier liquid crystal panel has a plurality of X electrodes and a plurality of Y electrodes that intersects the plurality of X electrodes respectively,
wherein the plurality of X electrodes is composed of a plurality of first X electrodes and a plurality of second X electrodes which are disposed alternately,
wherein the plurality of Y electrodes is composed of a plurality of first Y electrodes and a plurality of second Y electrodes which are disposed alternately,
wherein the driving voltage is input to the plurality of first X electrodes, the plurality of second X electrodes, and the plurality of first Y electrodes, and
wherein a reverse driving voltage which has a reverse phase with respect to the driving voltage is input to the plurality of second Y electrodes.

4. The stereoscopic display device according to claim 3, wherein the plurality of X electrodes and the plurality of second Y electrodes are short-circuited while both the p-type transistor and the n-type transistor are turned off.

5. The stereoscopic display device according to claim 1, wherein the plurality of X electrodes and the plurality of Y electrodes are short-circuited while both the p-type transistor and the n-type transistor are turned off.

6. The stereoscopic display device according to claim 3, wherein the plurality of X electrodes and the plurality of Y electrodes are short-circuited while both the p-type transistor and the n-type transistor are turned off.

* * * * *